US007655360B2

(12) United States Patent
Hennige et al.

(10) Patent No.: US 7,655,360 B2
(45) Date of Patent: Feb. 2, 2010

(54) ELECTRIC SEPARATOR COMPRISING A SHUTDOWN MECHANISM, METHOD FOR THE PRODUCTION THEREOF, AND USE IN LITHIUM BATTERIES

(75) Inventors: Volker Hennige, Duelmen (DE); Christian Hying, Rhede (DE); Gerhard Hoerpel, Nuttuln (DE)

(73) Assignee: Degussa AG, Duesseldorf (DE)

( * ) Notice: Subject to any disclaimer, the term of this patent is extended or adjusted under 35 U.S.C. 154(b) by 303 days.

(21) Appl. No.: 10/575,759

(22) PCT Filed: Aug. 19, 2004

(86) PCT No.: PCT/EP2004/051846

§ 371 (c)(1),
(2), (4) Date: Apr. 13, 2006

(87) PCT Pub. No.: WO2005/038960

PCT Pub. Date: Apr. 28, 2005

(65) Prior Publication Data
US 2007/0099072 A1    May 3, 2007

(30) Foreign Application Priority Data
Oct. 14, 2003    (DE)    ............................... 103 47 567

(51) Int. Cl.
*H01M 2/16* (2006.01)
*H01M 4/58* (2006.01)
(52) U.S. Cl. .................. 429/251; 429/249; 429/247; 429/231.95
(58) Field of Classification Search .................. 429/144, 429/254, 255
See application file for complete search history.

(56) References Cited

U.S. PATENT DOCUMENTS

| | | | | |
|---|---|---|---|---|
| 5,922,492 | A | * | 7/1999 | Takita et al. ................. 429/249 |
| 6,299,668 | B1 | | 10/2001 | Penth et al. |
| 6,299,778 | B1 | | 10/2001 | Penth et al. |
| 6,309,545 | B1 | | 10/2001 | Penth et al. |
| 6,340,379 | B1 | | 1/2002 | Penth et al. |
| 6,383,386 | B1 | | 5/2002 | Hying et al. |
| 6,620,320 | B1 | * | 9/2003 | Hying et al. ........... 210/500.25 |
| 6,841,075 | B2 | | 1/2005 | Penth et al. |
| 2002/0023419 | A1 | | 2/2002 | Penth et al. |
| 2002/0039648 | A1 | | 4/2002 | Horpel et al. |
| 2004/0028913 | A1 | | 2/2004 | Hennige et al. |
| 2004/0038105 | A1 | | 2/2004 | Hennige et al. |
| 2004/0262169 | A1 | | 12/2004 | Hying et al. |
| 2005/0014063 | A1 | * | 1/2005 | Shi et al. ..................... 429/144 |
| 2005/0031942 | A1 | | 2/2005 | Hennige et al. |
| 2005/0070193 | A1 | | 3/2005 | Hennige et al. |
| 2005/0084761 | A1 | | 4/2005 | Hennige et al. |
| 2005/0087491 | A1 | | 4/2005 | Hennige et al. |
| 2005/0221165 | A1 | * | 10/2005 | Hennige et al. ................ 429/62 |
| 2005/0221192 | A1 | | 10/2005 | Hennige et al. |
| 2005/0255769 | A1 | | 11/2005 | Henninge et al. |
| 2006/0024569 | A1 | | 2/2006 | Hennige et al. |
| 2006/0046138 | A1 | | 3/2006 | Hennige et al. |
| 2006/0078791 | A1 | | 4/2006 | Hennige et al. |
| 2007/0099072 | A1 | | 5/2007 | Hennige et al. |

FOREIGN PATENT DOCUMENTS

| | | |
|---|---|---|
| DE | 101 42 622 | 3/2003 |
| DE | 102 08 277 | 9/2003 |
| DE | 102 38 945 | 3/2004 |
| DE | 10238945 A1 * | 3/2004 |
| EP | 1 184 917 | 3/2002 |
| EP | 1 251 573 | 10/2002 |
| WO | 99/15262 | 4/1999 |
| WO | 99/62624 | 12/1999 |
| WO | WO 9962620 A1 * | 12/1999 |
| WO | 2004/021469 | 3/2004 |
| WO | 2004/049480 | 6/2004 |

OTHER PUBLICATIONS

U.S. Appl. No. 11/917,914, filed Dec. 18, 2007, Holzapfel, et al.
U.S. Appl. No. 12/063,626, filed Feb. 12, 2008, Hying, et al.
U.S. Appl. No. 12/021,436, filed Jan. 29, 2008, Pascaly, et al.
U.S. Appl. No. 12/066,146, filed Mar. 7, 2008, Schormann, et al.
U.S. Appl. No. 11/577,542, filed Apr. 19, 2007, Hoerpel, et al.
Washburn, Edward W. , "Note on a Method of Determining the Distribution of Pore sizes in a Porous Material", Physics, vol. 7, pp. 115-116, 1921.
Knittel, D. et al., "Untersuchungen zur permanenten Oleophobausruestung—Reaktive fluorierte Verbindungen", Textilveredlung, pp. 362-363, 1998.
Meffert, A. et al., "Fast method for determining the surface area of fine solids", pp. 187-193, 1967.(with English Translation).
U.S. Appl. No. 11/578,664, filed Oct. 18, 2006, Hoerpel, et al.
U.S. Appl. No. 10/588,952, filed Aug. 10, 2006, Nun, et al.
U.S. Appl. No. 12/388,671, filed Feb. 19, 2009, Hennige et al.

* cited by examiner

*Primary Examiner*—Dah-Wei D Yuan
*Assistant Examiner*—Zachary Best
(74) *Attorney, Agent, or Firm*—Oblon, Spivak, McClelland, Maier & Neustadt, L.L.P.

(57) ABSTRACT

An electrical separator for a lithium battery is composed of a porous carrier coated with a porous inorganic nonelectroconductive material and a porous shutdown layer on the porous inorganic nonelectroconductive coating. The shutdown layer melts at a selected temperature defined by layer composition. Upon melting, the pores of the inorganic layer are closed. Such an electrical separator provides a lithium battery of improved safety. A method to produce the electrical separator is provided.

22 Claims, No Drawings

ELECTRIC SEPARATOR COMPRISING A SHUTDOWN MECHANISM, METHOD FOR THE PRODUCTION THEREOF, AND USE IN LITHIUM BATTERIES

The present invention relates to electrical separators having a shutdown mechanism, a process for their production and their use in batteries, especially in lithium batteries.

An electrical separator is a separator which is used in batteries and other systems in which electrodes have to be separated from each other while maintaining ion conductivity for example.

The separator is customarily a thin porous insulating material possessing high ion perviousness, good mechanical strength and long-term stability to the chemicals and solvents used in the system, for example in the electrolyte of the battery. In batteries, the separator should fully electronically insulate the cathode from the anode, but be pervious to the electrolyte. Moreover, the separator has to be permanently elastic and to follow movements in the system, for example in the electrode pack in the course of charging and discharging.

The separator is a crucial determinant of the use life of the system in which it is used, for example the use life of battery cells. The development of rechargeable batteries is therefore crucially dependent on the development of suitable separator materials.

The general information about electrical separators and batteries may be gleaned for example from J. O. Besenhard in "Handbook of Battery Materials" (VCH-Verlag, Weinheim 1999).

Separators in use at present consist predominantly of porous organic polymeric films or of inorganic nonwovens, for example webs of glass or ceramic materials or else ceramic papers. These are produced by various companies. Important producers include Celgard, Tonen, Ube, Asahi, Binzer, Mitsubishi, Daramic and others. A typical organic separator consists for example of polypropylene or of a polypropylene/polyethylene/polypropylene composite.

Lithium batteries, which are widely used at the present time, are notable for many advantages, for example high specific energy density, no self-discharging and no memory effect, over systems having aqueous electrolytes, such as NiCd batteries or nickel-metal hydride batteries. But lithium batteries have the disadvantage that they contain a combustible electrolyte which, moreover, can very vigorously react with water. For high energy batteries, i.e. batteries containing a lot of active material, it is therefore important that the current circuit in the battery is interrupted in the event of an accident and an attendant heating-up of the cell. The interruption is customarily brought about by specific separators which consist of a composite of polypropylene(PP)-polyethylene(PE)-PP. At a certain temperature, the shutdown temperature, the PE will melt and the pores of the separator become closed and the current circuit is interrupted.

A disadvantage of these separators is their limited thermal stability, since the polypropylene will also melt as the cell continues to heat up, so that the entire separator will melt at this meltdown temperature and thus will allow internal short-circuiting over a large area, which will frequently destroy the battery cell by fire or even explosion. True, there are ceramic separators, for example ceramic papers or ceramic wovens or nonwovens, that do not exhibit the meltdown effect, but they unfortunately do not exhibit a shutdown effect either, and that is indispensable for high energy applications in particular and is demanded by battery manufacturers.

Separators or separator membranes without shutdown mechanisms are well known, for example from WO 99/15262. This reference also reveals the production of separators or membranes which are useful as separators. Preferably, however, the porous carriers used for the separators according to the invention are not electroconductive carriers such as woven metal fabrics for example, since the use of such carriers can give rise to internal shortcircuiting when the ceramic coating on the carrier is incomplete. Separators according to the invention therefore preferably comprise carriers composed of nonelectroconductive materials.

A recent development are hybridic separators which comprise ceramics and polymers. DE 102 08 277 discloses preparing separators based on polymeric substrate materials that have a ceramic, porous, electrically insulating coating. Despite the polymeric constituent present, these separators do not exhibit any shutdown effect when certain temperatures were exceeded, since it is believed that not all the pores were closed.

Commonly assigned DE 102 389 45 has very recently been the first to describe separators which comprise a ceramic layer, which prevents complete meltdown of the separator, and a shutdown layer of particles having a defined melting point, this shutdown layer ensuring secure cell shutdown in the event of a battery dysfunction. The problem with the shutdown layer described therein is the insufficient particle ruboff resistance, which may cause shutdown layer injury in the course of separator processing.

It is an object of the present invention to provide a separator which has a shutdown layer which is not damaged in the course of separator processing.

It has now been found, surprisingly, that an operable shutdown layer can be formed from porous sheetlike structures too and that such a shutdown layer has no ruboff resistance problems and hence a thus endowed separator can be processed with minimal risk of shutdown layer damage. This is especially surprising because a sufficiently high overall porosity is achievable for the separator even using porous sheetlike structures as a shutdown layer.

The present invention accordingly provides lithium battery separators having a shutdown function and comprising a porous carrier having a porous inorganic nonelectroconductive coating on and in this carrier, characterized in that the inorganic coating, which comprises oxidic particles of the elements Al, Si and/or Zr having an average particle size in the range from 0.5 to 10 µm, supports a porous shutdown layer composed of a material which melts at a predetermined temperature and closes the pores of the inorganic layer, the shutdown layer being formed by a porous sheetlike structure and the carrier comprising woven or non-woven polymeric or glass fibers.

The present invention further provides a process for producing a separator having a shutdown function, which comprises a porous inorganic layer of a separator having applied to and fixed on it a porous sheetlike structure as a porous layer (shutdown layer) composed of a material which has a defined, desired melting temperature which is not more than the melting temperature of the carrier material and less than the melting temperature of the inorganic layer.

The present invention yet further provides for the use of inventive separators in batteries, especially lithium batteries, and also the batteries themselves which comprise such a separator according to the present invention.

The separators according to the present invention, comprising a porous carrier having a porous inorganic nonelectroconductive coating on and in the carrier and comprising a shutdown layer which is composed of a material melting at a predetermined temperature and which is present on the inorganic coating and bonded to this layer, have the advantage of comprising excellent safety characteristics. These separators according to the present invention comprise a shutdown mechanism which is based on the shutdown layer melting at a predetermined temperature and closing the separator by the material of the shutdown layer penetrating into the pores of the inorganic material and closing them. The separator according to the present invention can never melt down, since the inorganic layer prevents large-area short circuiting within the battery even at higher temperatures. The separators according to the present invention thus meet the demands of various battery manufacturers for a safety shutdown within the battery cells. The inorganic particles ensure that there can never be a meltdown. It is accordingly ensured that there are no operating states that give rise to large-area short circuiting.

Compared with separators which exclusively comprise a flexible porous sheetlike structure as a carrier, the separators according to the present invention have the advantage that the carrier material used may be a polymeric material which has a high melting point and thus the production of the ceramic coating is simple to accomplish, and the shutdown material used may be a material which may have a lower, exactly defined melting point. With the process according to the present invention, separator strength and the way the separator is produced are no longer dependent on the shutdown material desired.

Suitable choice of the porous sheetlike structure used as shutdown layer and especially of the size of the pores in the porous sheetlike structure used ensures that separator porosity and hence separator performance is only minimally reduced, if at all.

The separator according to the present invention is also very safe in the event of internal shortcircuiting due to an accident for example. If, for example, a nail were to puncture the battery, the following would happen, depending on the type of separator: a polymeric separator would melt at the site of puncture (a shortcircuiting current flows through the nail and causes it to heat up) and contract. As a result, the shortcircuiting location would become larger and larger and the reaction would get out of control. Only the polymeric shutdown layer would melt in the case of the separator according to the present invention, but not the inorganic separator material. Thus, the reaction in the interior of the battery cell following such an accident would proceed much more moderately. This battery is thus distinctly safer than one with a polymeric separator. This is an important factor in mobile applications in particular.

The advantages of the separator according to the present invention for use in lithium ion batteries can be summarized as follows:
  High porosity
  Ideal pore size
  Low thickness
  Low basis weight
  Very good wettability
  High safety, i.e. no meltdown but a shutdown effect
  Low risk of shutdown layer being damaged during processing The separator according to the present invention and a process for producing it will now be described without the invention intending to be limited to these embodiments.

The inventive lithium battery separator with shutdown function, comprising a porous carrier having a porous inorganic nonelectroconductive coating on and in this carrier is characterized in that the inorganic coating, which comprises oxidic particles of the elements Al, Si and/or Zr having an average particle size in the range from 0.5 to 10 µm, supports a porous shutdown layer composed of a material which melts at a predetermined temperature and closes the pores of the inorganic layer, the shutdown layer being formed by a porous sheetlike structure and the carrier comprising or consisting of woven or non-woven polymeric or glass fibers, preferably polymeric fibers. The shutdown layer is preferably formed by a woven, nonwoven, felt, formed-loop knit or porous film.

It is possible in principle for the shutdown layer to be present on both sides of the separator.

But it has been determined to be advantageous for the shutdown layer to be present on only one side of the separator according to the present invention. A single shutdown layer is sufficient to ensure secure shutdown in case of need.

The separators according to the present invention preferably comprise carriers which are flexible and preferably less than 50 µm in thickness. The flexibility of the carrier ensures that the separator according to the present invention can be flexible too. Such flexible separators have more diverse applications, for example in wound cells. Carrier thickness has a substantial influence on separator properties, since not only the flexibility but also the sheet resistance of the electrolyte-saturated separator is dependent on carrier thickness.

The separator according to the present invention therefore preferably comprises carriers less than 30 µm and more preferably less than 20 µm in thickness. To be able to achieve sufficiently high battery performance, especially in the case of lithium ion batteries, it has been determined to be advantageous for the separator according to the present invention to comprise a carrier whose porosity is preferably above 50%, more preferably in the range from 50% to 97%, even more preferably in the range from 60% to 90% and most preferably in the range from 70% to 90%. Porosity in this context is defined as the volume of the nonwoven (100%) minus the volume of the fibers of the nonwoven, i.e. the fraction of the volume of the nonwoven that is not taken up by material. The volume of the nonwoven can be calculated from the dimensions of the nonwoven. The volume of the fibers is calculated from the measured weight of the nonwoven in question and the density of the fibers, in particular the polymeric fibers. It can be similarly advantageous for the carrier to have a pore radius distribution where at least 50% of the pores have a pore radius in the range from 75 to 150 µm.

The porous carrier preferably comprises woven or non-woven polymeric or glass fibers. More preferably, the carrier includes or is a woven or non-woven glass or polymeric fabric. The polymeric fibers of the carrier are preferably nonelectroconductive fibers of polymers which are preferably selected from polyacrylonitrile (PAN), polyesters, e.g. polyethylene terephthalate (PET), and/or polyolefin (PO), for example polypropylene (PP) or polyethylene (PE) or mixtures of such polyolefins. The polymeric fibers of the carriers are preferably from 0.1 to 10 µm and more preferably from 1 to 5 µm in diameter. Particularly preferred flexible nonwovens have a basis weight of less than 20 g/m$^2$ and preferably from 5 to 10 g/m$^2$. This ensure a particularly low thickness and high flexibility of the carrier.

The carrier of the separator according to the present invention is particularly preferably a polymeric nonwoven less than 30 µm and preferably from 10 to 20 µm in thickness. It is particularly important that the nonwoven have a very homogeneous pore radius distribution for use in a separator according to the present invention. A very homogeneous pore radius distribution in the nonwoven in conjunction with optimally adapted oxide particles of a specific size leads to an optimized porosity for the separator according to the present invention.

The separator according to the present invention comprises, on and in the carrier, a coating which is porous, electrically insulating and inorganic and comprises oxidic particles of the elements Al, Si and/or Zr having an average particle size in the range from 0.1 to 10 µm and preferably from 0.5 to 5 µm. It is particularly preferable for the separator to comprise, present on and in the carrier, a porous inorganic coating which comprises aluminum oxide particles having an average particle size in the range from 0.1 to 10 µm and most preferably from 0.5 to 5 which are adhered together by an oxide of the metals Zr or Si. Owing to the presence of the inorganic coating on and in the porous carrier, the mechanical properties of the separator according to the present invention are distinctly improved. For instance, spalling of the inorganic coating off the carrier, which can lead to fatal separator failure, can thereby be avoided.

The separators according to the present invention are preferably bendable down to any radius down to 100 m, preferably down to 50 mm and most preferably down to 0.5 mm without damage. The separators according to the present invention are also notable for a breaking strength of not less than 1 N/cm, preferably of not less than 3 N/cm and most preferably of more than 6 N/cm. The high breaking strength and the good bendability of the separator according to the present invention have the advantage that the separator is able to follow electrode geometry changes occurring in the course of the charging and discharging of the battery without the separator becoming damaged. The bendability, moreover, has the advantage that commercially standardized wound cells can be manufactured using this separator. With these cells, the electrode-separator plies are spirally wound up with each other in standardized size and contacted.

The shutdown layer which, according to the present invention, is a present on the inorganic layer can consist for example of natural or artificial waxes, (low-melting) polymers, for example specific polyolefins, for example polyethylene or polypropylene, or polymer blends or mixtures, in which case the material for the shutdown layer is selected so that the shutdown layer will melt at the desired shutdown temperature and close the pores of the separator, substantially preventing any further ion flux. Preferred materials for the shutdown layer are shutdown layer materials which have a melting point of not more than 180° C. and preferably less than 130° C. It is particularly preferable for the separator according to the present invention to comprise, as material for the shutdown layer, a material which has the same or a lower, preferably a lower, melting point as the material of the carrier or portions thereof. Preferably, the melting temperature difference between carrier material and shutdown layer material is at least 10 K. The use of materials which bring about shutdown at relatively low temperatures makes it possible to very substantially avoid melting or flaming of the materials surrounding the batteries, such as housings or cables for example. It is particularly preferable for the separator according to the present invention to comprise a shutdown layer composed of polyethylene (wax).

Shutdown layer thickness is in principle freely choosable, as long as it is ensured that any reduction in ion flux and hence in separator conductivity, which would entail a reduction in battery performance, is prevented. Shutdown layer thickness is only critical insofar as an excessively thick layer would unnecessarily increase the resistance in the battery system. To ensure secure shutdown, the shutdown layer thickness should be in the range from 1 to 20 µm and preferably in the range from 5 to 10 µm. Shutdown layer porosity is preferably in the range from 30% to 90% and more preferably in the range from 60% to 80%. It can be advantageous for the shutdown layer material and at least portions of the carrier material to be identical. In contrast to separators which have no additional shutdown layer and where the polymeric carrier material alone is not sufficient as shutdown material (since inorganic particles are present between the pores of the material and prevent complete closure), the additional material of the shutdown layer ensures secure shutdown.

The porosity of the separator according to the present invention is preferably in the range from 30% to 80%. Porosity here refers to accessible, i.e. open, pores. Porosity in this sense can be determined by the familiar method of mercury porosimetry or can be calculated from the volume and the density of the ingredients used on the assumption that open pores only are present. By average pore size and by porosity are meant the average pore size and the porosity which is determinable by the known method of mercury porosimetry, for example by means of a 4 000 porosimeter from Carlo Erba Instruments. Mercury porosimetry is based on the Washburn equation (E. W. Washburn, "Note on a Method of Determining the Distribution of Pore Sizes in a Porous Material", *Proc. Natl. Acad. Sci.*, 7, 115-16 (1921)).

The inventive separators having a shutdown function are preferably less than 50 µm, more preferably from 5 to 40 µm and most preferably from 20 to 35 µm in thickness. Separator thickness has a substantial influence on separator properties, since not only the flexibility but also the sheet resistance of the electrolyte-saturated separator is dependent on the thickness of the separator. Low thickness ensures a particularly low ionic resistance on the part of the separator in use with an electrolyte. The separator itself does of course have a very high electrical resistance, since it itself must have insulating properties. Moreover, thinner separators permit an increased packing density in a battery stack, so that a larger amount of energy can be stored in the same volume.

The inventive separators having a shutdown function are preferably produced by the inventive process for producing a separator having a shutdown function, which process comprises a porous inorganic layer of a separator having applied to and fixed on it a porous sheetlike structure as a porous layer (shutdown layer) composed of a material which has a defined, desired melting temperature which is not more than the melting temperature of the carrier material and less than the melting temperature of the inorganic layer. In principle, any separator comprising an inorganic layer on a porous carrier is useful as a starting material for producing separators according to the present invention.

The production of specific separators and of membranes which are useful as separators in the process according to the present invention is known in principle from WO 99/15262. The use described therein of electroconductive ingredients and flexible carriers, for example stainless steel, however, can lead to separators being obtained which have only very little utility, if any, for producing the separators according to the present invention. The use of separators produced as per the hereinbelow described process has been determined to be particularly advantageous in the process for producing the separator according to the present invention.

The separators which are preferable for use as a separator in the process according to the invention are obtained by applying a suspension, the inorganic nonelectroconductive particles to a porous nonelectroconductive carrier and then solidifying the suspension to form an inorganic coating on and in the porous carrier.

Examples of ways to apply the suspension to the carrier include printing on, pressing, pressing in, rolling on, knife-coating on, spreadcoating on, dipping, spraying or pouring on.

The carrier used is preferably less than 30 µm, more preferably less than 20 µm and even more preferably from 10 to 20 µm in thickness. Particular preference is given to using carriers as described in the description of the separator according to the present invention. The porous carrier used thus preferably comprises woven or non-woven polymeric, glass or ceramic fibers. More preferably, the carrier comprises or is a woven or nonwoven glass or polymeric fabric.

The carrier used preferably comprises polymeric fibers which have a softening temperature of more than 100° C. and a melting temperature of more than 110° C. It can be advantageous for the polymeric fibers to be from 0.1 to 10 μm and preferably from 1 to 5 μm in diameter.

The suspension used for producing the coating comprises at least one oxide of aluminum, of silicon and/or of zirconium and at least one sol of the elements Al, Zr and/or Si and is prepared by suspending particles of at least one oxide in at least one of these sols. The particles used are preferably from 0.1 to 20 μm in average particle size, for producing the separators according to the present invention preferably from 0.5 to 10 μm in average particle size.

The sols are obtained by hydrolyzing at least one compound of the elements Zr, Al and/or Si. It can be similarly advantageous for the compound to be hydrolyzed to be introduced into alcohol or an acid or a combination of these liquids prior to hydrolysis. The compound to be hydrolyzed is preferably at least one nitrate, chloride, carbonate or alkoxide compound of the elements Zr, Al and/or Si. The hydrolysis is preferably carried out in the presence of liquid water, water vapor, ice or an acid or a combination thereof.

In one version of the process for producing the separator which can be used, hydrolysis of the compounds to be hydrolyzed is used to prepare particulate sols. These particulate sols are notable for the compounds formed by hydrolysis being present in the sol in particulate form. The particulate sols can be prepared as described above or as in WO 99/15262. These sols customarily have a very high water content, which is preferably above 50% by weight. It can be advantageous for the compound to be hydrolyzed to be introduced into alcohol or an acid or a combination of these liquids prior to hydrolysis. The hydrolyzed compound may be peptized by treatment with at least one organic or inorganic acid, preferably with a 10-60% organic or inorganic acid, particularly preferably with a mineral acid selected from sulfuric acid, hydrochloric acid, perchloric acid, phosphoric acid and nitric acid or a mixture thereof. The particulate sols thus prepared can subsequently be used for preparing suspensions, in which case it is preferable to prepare suspensions for application to polymeric sol pretreated polymeric fiber nonwovens.

In a further version of the process for producing a separator which can be used in the process of the present invention, hydrolysis of the compounds to be hydrolyzed is used to prepare polymeric sols. These polymeric sols are notable for the fact that the compounds formed by hydrolysis are present in the sol in polymeric form, i.e. in the form of chains crosslinked across a relatively large space. The polymeric sols customarily include less than 50% by weight and preferably much less than 20% by weight of water and/or aqueous acid. To obtain the preferred fraction of water and/or aqueous acid, the hydrolysis is preferably carried out in such a way that the compound to be hydrolyzed is hydrolyzed with from 0.5 to 10 times the molar ratio and preferably with half the molar ratio of liquid water, water vapor or ice, based on the hydrolyzable group of the hydrolyzable compound. The amount of water used can be up to 10 times in the case of compounds which are very slow to hydrolyze, such as tetraethoxysilane. Compounds which are very quick to hydrolyze, such as zirconium tetraethoxide, are perfectly capable under these conditions of forming particulate sols as it is, which is why it is preferable to use 0.5 times the amount of water to hydrolyze such compounds. A hydrolysis with less than the preferred amount of liquid water, water vapor or ice likewise leads to good results, although using more than 50% less than the preferred amount of half the molar ratio is possible but not very sensible, since hydrolysis would no longer be complete and coatings based on such sols would not be very stable using an amount below this value.

To prepare these sols with the desired very small amount of water and/or acid in the sol, it can be advantageous for the compound to be hydrolyzed to be dissolved in an organic solvent, especially ethanol, isopropanol, butanol, amyl alcohol, hexane, cyclohexane, ethyl acetate and/or mixtures thereof, before the actual hydrolysis is carried out. A sol thus prepared can be used for preparing the suspension of the present invention or as an adhesion promoter in a pretreatment step.

Both the particulate sols and polymeric sols can be used as a sol in the process for preparing the suspension. Not just sols which are obtainable as just described can be used, but in principle also commercially available sols, for example zirconium nitrate sol or silica sol. The process of preparing separators which can be used with preference in the process according to the present invention by applying a suspension to and solidifying it on a carrier is known per se from DE 101 42 622 and in similar form from WO 99/15262, but not all the parameters and ingredients are applicable to the preparation of the separator used in the process of the present invention. More particularly, the operation described in WO 99/15262 is in that form not fully applicable to polymeric nonwoven materials, since the very watery sol systems described therein frequently do not permit complete, in-depth wetting of the customarily hydrophobic polymeric nonwovens, since most polymeric nonwovens are only badly wetted by the very watery sol systems, if at all. It has been determined that even the minutest unwetted areas in the nonwoven material can lead to membranes or separators being obtained that have defects (for example holes or cracks) and hence are inutile.

It has been found that a sol system or suspension whose wetting behavior has been adapted to the polymers will completely penetrate the carrier materials, especially the nonwoven materials, and so provide defect-free coatings. In the process, it is therefore preferable to adapt the wetting behavior of the sol or suspension. This is preferably accomplished by preparing polymeric sols or suspensions of polymeric sols comprising one or more alcohols, for example methanol, ethanol or propanol or mixtures having one or more alcohols and also preferably aliphatic hydrocarbons. But other solvent mixtures are conceivable as well for addition to the sol or suspension in order that the wetting behavior thereof may be adapted to the nonwoven used.

It has been determined that the fundamental change to the sol system and to the suspension resulting therefrom leads to a distinct improvement in the adhesion properties of the ceramic components on and in a polymeric nonwoven material. Such good adhesions are normally not obtainable with particulate sol systems. Preference is therefore given to coating nonwovens comprising polymeric fibers with suspensions which are based on polymeric sols or were equipped with an adhesion promoter in a preceding step by treatment with a polymeric sol.

Particular preference is given to using aluminum oxide particles which preferably have an average particle size of 0.1 to 20 as metal oxide particles for producing the suspension. The mass fraction of the suspended component (particles) is preferably from 1 to 250 times and more preferably from 1 to 50 times that of the sol used.

Aluminum oxide particles in the range of the preferred particle sizes are obtainable for example from Martinswerke under the designations MZS 3 and MZS1 and from AlCoA under the designations CT3000 SG, CL3000 SG, CT1200 SG, CT800SG and HVA SG.

It has been determined that the use of commercially available oxide particles may in certain circumstances lead to unsatisfactory results, since the particle size distribution is frequently very broad. Preference is therefore given to using metal oxide particles which were classified by a conventional process, for example air sifting and hydroclassification.

To improve the adhesion of the inorganic components to polymeric fibers or nonwovens used as a substrate, but also to improve the adhesion of the shutdown layer to be applied later, it can be advantageous for the suspensions used to be admixed with adhesion promoters, for example organofunctional silanes, for example the Degussa silanes GLYMO, MEMO, AMEO, VTEO or Silfin. The admixing of adhesion promoters is preferred in the case of suspensions based on polymeric sols. Useful adhesion promoters include in particular compounds selected from the octyl silanes, the vinyl silanes, the amino-functionalized silanes, and/or the glycidyl-functionalized silanes, for example the Dynasilanes from Degussa. Particularly preferred adhesion promoters for polyethylene (PE) and polypropylene (PP) are vinyl-, methyl- and octylsilanes, although an exclusive use of methylsilanes is not optimal, for polyamides and polyamines they are amine-functional silanes, for polyacrylates and polyesters they are glycidyl-functionalized silanes and for polyacrylonitrile it is also possible to use glycidyl-functionalized silanes. Other adhesion promoters can be used as well, but they have to be adapted to the respective polymers. The adhesion promoters accordingly have to be selected so that the solidification temperature is below the melting or softening temperature of the polymer used as substrate and below its decomposition temperature. Useful adhesion promoters are in particular the silanes listed in Table 1. Suspensions according to the present invention preferably include distinctly less than 25% by weight and more preferably less than 10% by weight of compounds capable of acting as adhesion promoters. An optimal fraction of adhesion promoter results from coating the fibers and/or particles with a monomolecular layer of the adhesion promoter. The amount in grams of adhesion promoter required for this purpose can be obtained by multiplying the amount in g of the oxides or fibers used by the specific surface area of the materials in $m^2g^{-1}$ and then dividing by the specific area required by the adhesion promoter in $m^2g^{-1}$, the specific area required frequently being in the order of from 300 to 400 $m^2g^{-1}$.

Table 1 which follows contains an illustrative overview of usable adhesion promoters based on organofunctional silicon compounds for typical nonwoven material polymers.

TABLE 1

| Polymer | Organofunctional type | Adhesion promoter |
| --- | --- | --- |
| PAN | Glycidyl | GLYMO |
|  | Methacryloyl | MEMO |
| PA | Amino | AMEO, DAMO |
| PET | Methacryloyl | MEMO |
|  | Vinyl | VTMO, VTEO, VTMOEO |

TABLE 1-continued

| Polymer | Organofunctional type | Adhesion promoter |
| --- | --- | --- |
| PE, PP | Amino | AMEO, AMMO |
|  | Vinyl | VTMO, VTEO, Silfin |
|  | Methacryloyl | MEMO | where:
AMEO = 3-aminopropyltriethoxysilane
DAMO = 2-aminoethyl-3-aminopropyltrimethoxysilane
GLYMO = 3-glycidyloxytrimethoxysilane
MEMO = 3-methacryloyloxypropyltrimethoxysilane
Silfin = vinylsilane + initiator + catalyst
VTEO = vinyltriethoxysilane
VTMO = vinyltrimethoxysilane
VTMOEO = vinyltris(2-methoxyethoxy)silane The suspension present on and in the carrier as a result of the coatings can be solidified for example by heating at from 50 to 350° C. Since the maximum temperature is dictated by the carrier material when polymeric substrate materials are used, the maximum temperature must be adapted accordingly. Thus, depending upon the embodiment of the process, the suspension present on and in the carrier is solidified by heating at from 100 to 350° C. and most preferably by heating at from 200 to 280° C. It can be advantageous for the heating to take place at from 150 to 350° C. for from 1 second to 60 minutes. It is more preferable to solidify the suspension by heating at from 110 to 300° C. and most preferably at from 200 to 280° C. and preferably for from 0.5 to 10 min. The assembly may be heated by means of heated air, hot air, infrared radiation or by other heating methods according to the prior art.

The process for producing separators which can be used in the process according to the present invention can be carried out for example by unrolling the carrier off a reel, passing it at a speed of from 1 m/h to 2 m/s, preferably at a speed of from 0.5 m/min to 20 m/min and most preferably at a speed of from 1 m/min to 5 m/min through at least one apparatus which applies the suspension onto and into the carrier, for example a roll, and at least one further apparatus whereby the suspension is solidified on and in the carrier by heating, for example an electrically heated furnace, and rolling the separator thus produced up on a second reel. This makes it possible to produce the separator in a continuous process. Similarly, the pretreatment steps can be carried out on a continuous basis by observing the parameters mentioned.

The separators produced in this way or separators produced in some other way frequently comprise inorganic coatings having a very hydrophilic character when the separators were produced without use of an adhesion promoter. To achieve good adhesion of the porous sheetlike structure of the shutdown layer on hydrophilic porous inorganic layers as well, there are several possibilities.

In one version of the process according to the present invention, it has been determined to be advantageous to hydrophobicize the porous inorganic layer before the shutdown layer is applied. The production of hydrophobic membranes which can serve as starting material for producing the separators according to the present invention is described in WO 99/62624 for example. Preferably, the porous inorganic layer is hydrophobicized by treatment with alkyl-, aryl- or fluoroalkylsilanes marketed for example by Degussa under the tradename of Dynasilane. It is possible in this context to employ for example the familiar hydrophobicization methods which are employed inter alia for textiles (D. Knittel; E. Schollmeyer; Melliand Textilber. (1998) 79(5), 362-363), with minimal changes to the recipes, for porous composite materials that are pervious and were produced, for example, using the process described in PCT/EP98/05939 as well. To this end, a pervious composite material (membrane or separator) is treated with a solution which includes at least one hydrophobic material. It can be advantageous for the solvent in the solution to be water, preferably adjusted to a pH of 1-3 with an acid, preferably acetic acid, nitric acid or hydrochloric acid, and/or an alcohol, preferably ethanol. The solvent fraction attributable to acid-treated water or to alcohol can be in each case from 0% to 100% by volume. Preferably the fraction of the solvent which is attributable to water is in the range from 0% to 60% by volume and the fraction of solvent which is attributable to alcohol in the range from 40% to 100% by volume. The solvent has introduced into it from 0.1% to 30% by weight and preferably from 1% to 10% by weight of a hydrophobic material to prepare the solution. Useful hydrophobic materials include for example the above-recited silanes. Surprisingly, good hydrophobicization is obtained not just with strongly hydrophobic compounds such as for example triethoxy(3,3,4,4,5,5,6,6,7,7,8,8-tridecafluorooctyl)silane, but a treatment with methyltriethoxysilane, octyltriethoxysilane or i-butyltriethoxysilane is completely sufficient to obtain the desired effect. The solutions are stirred at room temperature to achieve uniform dissipation of the hydrophobic materials in the solution and subsequently applied to the porous inorganic layer and dried. Drying can be speeded up by treatment at temperatures in the range from 50 to 350° C. and preferably in the range from 150 to 200° C.

In a further version of the process according to the present invention, the porous inorganic layer can also be treated to give other adhesion promoters before the shutdown layer is applied. The treatment with one of the adhesion promoters mentioned in table 1 can then likewise be effected as described above, i.e. by treating the porous inorganic layer with the polymeric sol which includes a silane adhesion promoter. More particularly, the treatment can be effected such that adhesion promoters are used in the production of the separator as described above. Preference is given to adhesion promoters selected from hydrolyzed or nonhydrolyzed functionalized alkyltrialkoxysilanes. Very particular preference is given to using MEMO, AMEO and/or GLYMO adhesion promoters.

The shutdown layer based on a porous sheetlike structure is preferably created on the porous inorganic layer of the separator by applying a woven, formed-loop knit, felt, nonwoven or porous film as a porous sheetlike structure to the porous inorganic layer. The shutdown layer may be applied for example by laying or laminating the porous sheetlike structure onto the porous inorganic layer. The laminating can be carried out at room temperature or at elevated temperature below the melting temperature of the material of the sheetlike structure. In the case of laminating, the abovementioned adhesion promoters can be used as laminating agents. The adhesion promoters can be selected from the known series of the alkyltrialkoxysilanes. These adhesion promoters are preferably present in the form of solutions or sols and are either first applied to the polymer or to the separator and solidified there or else the silanes are introduced directly before or during the laminating step to adhere the polymer and the ceramic together. Examples of suitable silanes are available from Degussa as pure products or as aqueous solutions of the hydrolyzed silane for example under the designation Dynasilane 2926, 2907 or 2781.

Irrespective of whether the porous sheetlike structure is laminated (with or without use of a laminating agent) or else placed onto the porous inorganic layer, the shutdown layer applied to the porous inorganic layer can be fixed on the porous inorganic layer by single heating to a temperature above the glass transition temperature, so that incipient melting of the material without change in the actual shape of the porous sheetlike structure is achieved. When laminating agents or adhesion promoters have been used, the shutdown layer applied to the porous inorganic layer can also be heated once to a temperature of above 50 and below the melting temperature of the material of the shutdown layer so that the shutdown layer are adhered to the separator via the adhesion promoters.

However, such a thermal treatment can also be required to activate the silanes for use as adhesion promoters in order that they may adhere the shutdown layer to the ceramic separator.

In a preferred embodiment, MEMO is used as an adhesion promoter between the shutdown layer and the ceramic separator. Activation is in this case effected using UV light having a preferred wavelength in the range from 200 to 300 nm.

Another way of fixing the shutdown layer to the porous inorganic layer of the separator is for example to place the shutdown layer on the porous inorganic layer and fix it in place in the course of battery fabrication, for example by trapping it in coils wound during the production of wound cells or in appropriately stacked prismatic cells.

Useful materials for the shutdown layer include all materials having a defined melting point. The material for the shutdown layer is chosen according to the desired shutdown temperature. Since relatively low shutdown temperatures are desired for most batteries, it is advantageous to use porous sheetlike structures as a material for a shutdown layer which are selected from polymers, polymer blends, natural and/or artificial waxes. These preferably have a melting temperature of not more than 180° C. and preferably less than 150° C. and most preferably less than 130° C. It is particularly preferable to use shutdown layers composed of polypropylene (erase) or polyethylene (wax). Possible suppliers for such polymeric sheetlike structures are typical nonwovens suppliers such as Freudenberg or manufacturers of organic separators such as Celgard, DSM, Asahi or Ube. As stated above, it can be advantageous when the material which makes up the porous sheetlike structure is identical to at least a portion of the material of the carrier.

The applying of the porous sheetlike structure and of any adhesion promoters and also any heating can be carried out continuously or quasi-continuously. When a flexible separator is used as a starting material, it can in turn be unwound off a reel, led through a coating, drying and, if appropriate, heating apparatus and then rolled up again.

The separators according to the present invention and the separators produced according to the present invention can be used in particular as a separator in batteries, in particular as a separator in lithium batteries, preferably lithium high power and high energy batteries. Such lithium batteries may comprise an electrolyte comprising lithium salts having large anions in carbonate solvents. Examples of suitable lithium salts are $LiClO_4$, $LiBF_4$, $LiAsF_6$ or $LiPF_6$, of which $LiPF_6$ is particularly preferred. Examples of organic carbonates useful as solvents are ethylene carbonate, propylene carbonate, dimethyl carbonate, ethyl methyl carbonate or diethyl carbonate or mixtures thereof.

The present invention also provides batteries, especially lithium batteries, comprising a separator according to the present invention or produced according to the present invention.

The present invention is described by the examples which follow without being restricted thereto.

COMPARATIVE EXAMPLE 1

S450PET Separator without Shutdown Function

To 160 g of ethanol were initially added 15 g of a 5% by weight aqueous $HNO_3$ solution, 10 g of tetraethoxysilane, 2.5 g of methyltriethoxysilane and 7.5 g of GLYMO Dynasilane (all Dynasilanes produced by Degussa AG). This sol, which was initially stirred for some hours, was then used to suspend 125 g each of the aluminum oxides Martoxid MZS-1 and Martoxid MZS-3 (both aluminum oxides produced by Martinswerke). This slip was homogenized with a magnetic stirrer for at least a further 24 h, during which the stirred vessel had to be covered over in order that no solvent loss occurred.

The above slip was then used to coat a PET nonwoven having a thickness of about 22 µm and a basis weight of about 15 g/m² in a continuous roll coating process at a belt speed of about 8 m/h and T=220° C. In this roll coating process, the slip is rolled on using a roll. The nonwoven was subsequently passed through an oven (length 1 m) which had the stated temperature. The same coating method and arrangement was used in the tests hereinbelow. The end result obtained was a separator having an average pore size of 450 nm and a thickness of about 50 µm. The Gurley number was about 10.

COMPARATIVE EXAMPLE 2

Lithium Ion Battery with Hybrid Ceramic Separator without Shutdown Function

An S450PET separator produced as per comparative example 1 is installed in a lithium ion cell consisting of a positive mass of $LiCoO_2$, a negative mass consisting of graphite and an electrolyte composed of $LiPF_6$ in ethylene carbonate/dimethyl carbonate. The charging and discharging behavior of this battery was tested. The battery decreases in capacity only minimally, by a few percentage points, after about 250 cycles of charging/discharging at C/5. Even increasing the charging voltage from 4.1 to 4.2 volts in the 200th charge cycle does not harm the battery.

This battery is shortcircuited via the external terminals. Owing to the large current which then flows and the internal resistance of the separator, the cell heats up very strongly to above 200° C. The safety value opens and the cell blows off i.e. the electrolyte escapes from the cell. But, owing to the ceramic nature of the separator, there is no meltdown which would further increase the temperature and could cause the cell to explode in certain circumstances. At the end, the cell has completely discharged.

EXAMPLE 1

S450PET/SD Separator with Shutdown Function (Inventive)

The separator as per comparative example 1 is treated with a sol of 2.5 g of AMEO and 2.5 g of GLYMO and also 2 g of 5% $HNO_3$ in 100 g of ethanol. The still moist separator has placed on it a porous PE film 10 µm in thickness and 60% in porosity and is dried at 110° C.

The separator has a Gurley number of about 20. The Gurley number rises to about 500 on heating at 130° C. for 10 min.

EXAMPLE 2

S450PET/SD Separator with Shutdown Function (Inventive)

The separator as per comparative example 1 was treated with a sol of 5 g of MEMO and 2 g of 5% $HNO_3$ in 100 g of ethanol. The still moist separator had a porous PE film 10 µm in thickness and 60% in porosity placed on it and was irradiated with UV light at a wavelength of 254 mm.

The separator has a Gurley number of about 20. The Gurley number rises to about 500 on heating at 130° C. for 10 min.

EXAMPLE 3

S450PET/SD Separator with Shutdown Function (Inventive)

The separator as per comparative example 1 had a PE nonwoven 8 µm in thickness and about 70% in porosity laminated onto it at elevated pressure and a temperature of 115° C.

The separator has a Gurley number of about 15. The Gurley number rises to about 500 on heating at 130° C. for 10 min.

EXAMPLE 4

Battery with Separator as Per Example 1

An S450PET/SD separator produced as per example 1 was installed in a lithium ion cell consisting of a positive mass of $LiCoO_2$, a negative mass consisting of graphite and an electrolyte composed of $LiPF_6$ in ethylene carbonate/dimethyl carbonate. The charging and discharging behavior of this battery was tested. The battery decreases in capacity only minimally, by a few percentage points, after about 250 cycles of charging/discharging at C/5. Even increasing the charging voltage from 4.1 to 4.2 volts in the 200th charge cycle did not harm the battery.

This battery was subsequently short circuited via the external terminals. Owing to the large current which then flows and the internal resistance of the separator, the cell heats up very strongly. But at 130° C. the shutdown layer melts and the current breaks down. The temperature continues to rise only a little, the safety valve does not open. No electrolyte escapes.

Determination of BP:

The bubble point (BP) is that pressure in bar at which a gas bubble passes through a completely wetted membrane (separator). The bubble point is a measure of the size of the largest pore or defect in a membrane. The smaller the BP, the larger the largest pore or largest defect (hole).

The bubble point was measured by trimming a membrane to a 30 mm diameter size. The trimmed membrane was then immersed in the wetting liquid (completely ion-free water) for at least one day. The membrane thus prepared was installed in an apparatus between a round sintered metal disk having a BP of about 0 bar (measurement without membrane), which serves as a support material, and a silicone rubber seal, the apparatus containing above the membrane a vessel which was open at the top, which had the same cross-section as the membrane and which was filled with 2 cm of completely ion-free water and below the membrane a second vessel which likewise had the same cross-section as the membrane and which was equipped with an air inlet by which compressed air could be passed into the vessel via a pressure reduction valve. The membrane was installed underneath the sintered metal disk, so that the sintered metal disk formed the bottom of the upper vessel and the membrane sealed off the lower vessel. The pressure was then raised in the lower vessel in 0.1 bar increments at half minute intervals between each increase in pressure. After each increase in pressure, the water surface in the upper vessel was observed for about half a minute. As soon as the first small gas bubbles appear at the water surface, the BP pressure is reached and the measurement was discontinued.

Determination of Gurley Number

The Gurley number was determined in the same apparatus as BP. However, the time t was determined which a gas volume of 100 ml requires to pass through a 6.45 cm$^2$ area at a 31 cm hydrohead gas pressure. The time t is the Gurley number.

What is claimed is:

1. A lithium battery comprising an electrical separator comprising:
   a porous carrier;
   a porous inorganic nonelectroconductive coating on a surface and in the pores of the porous carrier; and
   a porous shutdown layer on the porous inorganic nonelectroconductive coating; wherein
   the porous carrier is nonelectroconductive and has a porosity greater than 50%,
   the porous inorganic nonelectroconductive coating comprises particles of at least one selected from the group consisting of an oxide of Al, an oxide of Si and an oxide of Zr, the particles have an average particle size in the range from 0.5 to 10 µm, and in the porous inorganic nonelectroconductive coating the particles are adhered together by an oxide of Al, Si or Zr, and
   the porous shutdown layer comprises a sheet of materials selected such that the shutdown layer will melt at a temperature determined as the shutdown temperature of the electrical separator.

2. A process for producing the electrical separator for a lithium battery according to claim 1, comprising:
   preparing a suspension of inorganic nonelectroconductive particles in a sol;
   applying the suspension to the surface and pores of a porous carrier to coat the carrier;
   drying the coated carrier to form a porous inorganic nonelectroconductive coating on the surface and in the pores of the porous carrier; and
   fixing on the porous inorganic nonelectroconductive coating a porous sheet shutdown layer;
wherein
   the porous carrier is nonelectroconductive and has a porosity greater than 50%,
   the inorganic nonelectroconductive particle comprises at least one oxide selected from the group consisting of an oxide of Al, an oxide of Si and an oxide of Zr,
   the particles have an average particle size in the range from 0.5 to 10 µm,
   the sol comprises a hydrolysis product of a compound of Al, Si or Zr, and
   the porous sheet shutdown layer comprises materials selected such that the shutdown layer will melt at a temperature determined as the shutdown temperature of the electrical separator.

3. The separator of claim 1,
   wherein the shutdown layer is at least one selected from the group consisting of a woven, a nonwoven, a felt, a formed-loop knit and a porous film.

4. The separator of claim 1, wherein
   the separator is bendable down to a radius of 0.5 mm, and the carrier is less than 50 µm in thickness.

5. The separator according to claim 4, wherein
   the carrier is a nonwoven comprising polymeric fibers.

6. The separator of claim 1, wherein
   the polymeric fibers of the carrier are selected from fibers of the group consisting of polyacrylonitrile, polyester, polyamide and mixtures thereof.

7. The separator of claim 1, wherein
   the shutdown layer is from 1 to 20 µm in thickness.

8. The separator of claim 1, wherein
   the shutdown layer comprises at least one material selected from the group consisting of polymers, polymer blends, natural or artificial waxes and mixtures thereof.

9. The separator of claim 1, wherein
   the shutdown layer consists of a material which has a melting temperature of less than 130° C.

10. The separator of claim 1, wherein
    the material of the shutdown layer and at least portions of the material of the carrier are identical.

11. The process of claim 2, further comprising
    treating the porous inorganic nonconductive coating with a hydrophobicing agent before fixing the porous sheet shutdown layer.

12. The process of claim 2, further comprising treating the porous inorganic coating with an adhesion promoter before fixing the porous sheet shutdown layer.

13. The process according to claim 12,
    wherein the sol is a polymeric sol comprising a silane adhesion promoter for the shutdown layer to be applied later.

14. The process of claim 12,
    wherein the adhesion promoter is a hydrolyzed or nonhydrolyzed functionalized alkyltrialkoxysilane.

15. The process of claim 2,
    wherein the porous sheet shutdown layer comprises a woven, formed-loop knit, felt, nonwoven or porous film.

16. The process of claim 12,
    wherein fixing the porous sheet shutdown layer comprises heating once to a temperature above 50° C. and below the melting temperature of the material of the porous sheet shutdown layer so that the shutdown layer are adhered to the separator via the adhesion promoters.

17. The process of claim 2,
    wherein fixing the porous sheet shutdown layer comprises heating once to a temperature above the glass transition temperature of the porous sheet shutdown layer to incipiently melt the material without changing the actual shape.

18. The process of claim 2,
    wherein fixing the porous sheet shutdown layer comprises laminating the porous sheet shutdown layer to the porous inorganic nonelectroconductive coating.

19. The process of claim 2,
    wherein fixing the porous sheet shutdown layer comprises applying the porous sheet shutdown layer to the porous inorganic nonelectroconductive coating and being trapped in a coil wound during battery fabrication.

20. The process of claim 2, wherein
a material for the porous sheet shutdown layer is at least one selected from the group consisting of polymers, polymer blends and natural and/or artificial waxes, and
the material has a melting temperature of less than 180° C.

21. The process according to claim 20, wherein the porous sheet shutdown material is polyethylene.

22. A method for the production of a lithium battery comprising employing the separator of claim 1 as a separator in the lithium battery.

* * * * *